United States Patent
Huang et al.

(10) Patent No.: US 12,533,508 B2
(45) Date of Patent: Jan. 27, 2026

(54) IN VITRO TRAINING METHOD AND DEVICE FOR IMPROVING SLEEP APNEA

(71) Applicant: METAL INDUSTRIES RESEARCH & DEVELOPMENT CENTRE, Kaohsiung (TW)

(72) Inventors: Bol-Wei Huang, Kaohsiung (TW); Yu-Sheng Lin, Kaohsiung (TW); Tung-Lin Tsai, Tainan (TW); Chun-Chieh Tseng, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 313 days.

(21) Appl. No.: 18/455,283

(22) Filed: Aug. 24, 2023

(65) Prior Publication Data
US 2025/0065110 A1 Feb. 27, 2025

(51) Int. Cl.
*A61N 1/05* (2006.01)
*A61N 1/04* (2006.01)

(52) U.S. Cl.
CPC ......... *A61N 1/0548* (2013.01); *A61N 1/0452* (2013.01); *A61N 1/0472* (2013.01)

(58) Field of Classification Search
None
See application file for complete search history.

(56) References Cited

U.S. PATENT DOCUMENTS

| | | | |
|---|---|---|---|
| 5,190,053 A * | 3/1993 | Meer | A61N 1/0548 600/529 |
| 9,833,613 B2 | 12/2017 | Sama | |
| 10,058,701 B2 | 8/2018 | Sama | |
| 10,561,836 B2 | 2/2020 | Sama | |
| 10,596,366 B2 | 3/2020 | Sama | |
| 11,707,618 B2 | 7/2023 | Sama | |

(Continued)

FOREIGN PATENT DOCUMENTS

| | | |
|---|---|---|
| CN | 107106844 A | 8/2017 |
| CN | 112469472 A | 3/2021 |

(Continued)

OTHER PUBLICATIONS

Cancelli et al., Personalizing the Electrode to Neuromodulate an Extended Cortical Region, Brain Stimulation, Jan. 2015, pp. 555-560, vol. 8,3.

*Primary Examiner* — Michael W Kahelin
(74) *Attorney, Agent, or Firm* — WPAT, PC (57) ABSTRACT

An in vitro training method includes scanning a user's oral cavity to create a first oral cavity model. An articulator body is selected according to the first oral cavity model, and plural first customized electrode sheets are formed and assembled onto the articulator body to obtain an in vitro training device. The user bites the in vitro training device during a non-sleep period and uses the plural first customized electrode sheets to proceed with electrical stimulation on a top surface and two sides of a tongue of the user, thereby training a muscular endurance of infrahyoid muscles of the user for a training period. The user's oral cavity is scanned again to create a second oral cavity model. The first oral cavity model is compared with the second oral cavity model to timely renew the customized electrode sheets when the image over rate is lower than 80%.

6 Claims, 4 Drawing Sheets

(56) References Cited

U.S. PATENT DOCUMENTS

| | | |
|---|---|---|
| 11,745,009 B2 | 9/2023 | Sama |
| 2020/0121924 A1 | 4/2020 | Sama |
| 2020/0121984 A1 | 4/2020 | Sama |
| 2021/0260398 A1 | 8/2021 | Bilston et al. |

FOREIGN PATENT DOCUMENTS

| | | |
|---|---|---|
| CN | 113195041 A | 7/2021 |
| CN | 113226442 A | 8/2021 |
| JP | 2022505305 A | 1/2022 |

* cited by examiner

IN VITRO TRAINING METHOD AND DEVICE FOR IMPROVING SLEEP APNEA

BACKGROUND OF THE INVENTION

1. Field of the Invention

The present invention relates to an in vitro training method and an in vitro device for improving sleep apnea and, more particularly, to an in vitro training method and an in vitro training device used for improving sleep apnea during a non-sleep period.

2. Description of the Related Art

According to the investigation by the World Health Organization (WHO), up to one billion of adults (aged 30-69) suffer from obstructive sleep apnea (OSA), including 42 millions of OSA patients in the U.S., among which one in every five adults suffers from mild OSA, and one in every fifteen adults suffers from severe OSA. Furthermore, according to the statistics of the Taiwan Society of Sleep Medicine (TSSM), about 450,000 people in Taiwan have poor sleep quality due to apnea.

The major causes of sleep apnea include a narrow airway which is inherent or caused by obesity, or an airway blockage resulting from collapse which tends to occur due to insufficient muscle tension in the airway of an aged body. The types of blockage causing sleep apnea include nasal cavity blockage, soft palate blockage in the oral cavity, and tongue root blockage.

About 70% of the patients (about 0.65 billions of people in the world, including at least 300,000 people in Taiwan) belong to the tongue root blockage type which is the most common. The tongue root blockage is strongly relevant to reduction in actuation of upper airway muscles and weakened activation of infrahyoid muscles. OSA patients not only snore (which adversely affects the sleep quality of the person sleeping nearby) but also have poor sleep quality, leading to drowsiness in the daytime and reduced concentration and, in severe cases, may even cause sudden death due to apnea during the sleep period.

However, medicines for treating sleep apnea are not available currently. Common conventional methods for improving sleep apnea include: (1) using a mandibular advancement device which is suitable for mild and moderate sleep apnea patients, but the patients are difficult to sleep due to a sensation of a foreign body in the oral cavity caused by the mandibular advancement device; (2) instrument therapy: for example, wearing a continuous positive airway pressure (CPAP) on the face of a patient during sleep, thereby continuously filling air into the airway and, thus, expanding the airway, but the CPAP instrument is bulky and expensive, and the comfort and quality of sleep are adversely affected by many pipes distributed around the head of the user; (3) surgical treatment: for example, cutting the uvula or the tonsil to enlarge the airway, or implanting an electrical stimulation device to electrically stimulate the infrahyoid muscles and other muscles of the upper airway during sleep to thereby increase the muscle tension of the airway muscles. As for mild and moderate sleep apnea patients who are difficult to accept or withstand the CPAP therapy, surgical implantation of an electrical stimulation device is considered. However, the operation involves infection risks, and removal of the device and re-implantation are required when the device malfunctions, and the electrical stimulation during sleep will adversely affect the sleep quality of the patient.

The above conventional methods are used during the sleep period of the user. By contrast, in recent years, a conventional training device for sleep apnea is used during the non-sleep period. The user only has to place an articulator into the mouth to proceed with electrical stimulation of the infrahyoid muscles, thereby restoring the muscle tension through training while effectively avoiding the operational risks of implantation and the discomfort during sleep period. However, the articulator has only one specification, and clinically there is a relatively high percentage of uses unable to precisely proceed with electrical stimulation on the sides and the top portion of the tongue, such that the training effect is far below expectation. Thus, it is necessary to improve the conventional methods for improving sleep apnea.

SUMMARY OF THE INVENTION

To solve the above problems, it is an objective of the present invention to provide an in vitro training method for improving sleep apnea, in which electrode sheets on an articulator can be customized to assure a user to precisely train the infrahyoid muscles to restore the muscle tension.

It is another objective of the present invention to provide an in vitro training method for improving sleep apnea, thereby precisely suggesting the return appointment time.

It is a further objective of the present invention to provide an in vitro training device for improving sleep apnea, which is obtained from the above method.

It is still another objective of the present invention to provide an in vitro training device for improving sleep apnea, which is easy to use and carry.

As used herein, the term "a", "an" or "one" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, the term "engagement", "coupling", "assembly", or similar terms is used to include separation of connected members without destroying the members after connection or inseparable connection of the members after connection. A person having ordinary skill in the art would be able to select according to desired demands in the material or assembly of the members to be connected.

An in vitro training method for improving sleep apnea according to the present invention includes: scanning a user's oral cavity to create a first oral cavity model; selecting an articulator body according to the first oral cavity model, forming plural first customized electrode sheets, and assembling the plural first customized electrode sheets onto the articulator body to obtain an in vitro training device; the user biting the in vitro training device during a non-sleep period and using the plural first customized electrode sheets to proceed with electrical stimulation on a top surface and two sides of a tongue of the user, thereby training a muscular endurance of infrahyoid muscles of the user for a training period; scanning the user's oral cavity again to create a second oral cavity model; and comparing the first oral cavity model with the second oral cavity model, in a state that an image overlap rate of the first oral cavity model and the second oral cavity model is lower than 80%, plural second customized electrode sheets are formed according to the second oral cavity model to replace the plural first customized electrode sheets assembled on the articulator body.

Therefore, the in vitro training method for improving sleep apnea uses the customized electrode sheets to more precisely proceed with electrical stimulation on the infrahyoid muscles of the user to thereby train the muscular endurance of the infrahyoid muscles, which assists the user in restoring the original tension of the infrahyoid muscles and, thus, improves the airway blockage problem resulting from sinking of the tongue during the sleep period, thereby improving the symptoms of sleep apnea. Furthermore, the user may return to the hospital every once in a while to check the change in the type of the infrahyoid muscles, and new customized electrode sheets may be made timely according to the current type of the muscles. This ensures the user to proceed with effective electric stimulation training on the infrahyoid muscles for a long period of time to assure the training effect and may even improve the symptoms of sleep apnea more efficiently than the conventional methods.

In an example, when the image overlap rate of the first oral cavity model and the second oral cavity model is lower than 80% but not lower than 70%, a suggested return appointment waiting time equal to the training period is set. Therefore, an appropriate return appointment time can be precisely recommended to the user to renew the customized electrode sheets, thereby increasing the training effect and saving the user time.

In an example, when the image overlap rate of the first oral cavity model and the second oral cavity model is lower than 70%, a suggested return appointment waiting time shorter than the training period is set. Therefore, an appropriate return appointment time can be precisely recommended to the user to renew the customized electrode sheets, thereby increasing the training effect and saving the user time.

In an example, the suggested return appointment waiting time is shorter than two thirds of the training period and longer than a half of the training period. Therefore, an appropriate return appointment time can be precisely recommended to the user to renew the customized electrode sheets, thereby increasing the training effect and saving the user time.

In an example, when the image overlap rate of the first oral cavity model and the second oral cavity model is not lower than 80%, the plural first customized electrode sheets are not replaced, and a suggested return appointment waiting time shorter than the training period is set. Therefore, an appropriate return appointment time can be precisely recommended to the user to renew the customized electrode sheets, thereby increasing the training effect and saving the user time.

In an example, the suggested return appointment waiting time is shorter than a half of the training period and longer than one third of the training period. Therefore, an appropriate return appointment time can be precisely recommended to the user to renew the customized electrode sheets, thereby increasing the training effect and saving the user time.

The present invention further provides an in vitro training device for improving sleep apnea. The in vitro training device includes an articulator body, plural customized electrode sheets, and an electrical stimulation module. The articulator body includes an oral portion and an exposed portion. The oral portion includes plural engagement portions.

The plural customized electrode sheets are customized according to an oral cavity model of a user and are detachably engaged with the plural engagement portions. The electrical stimulation module is disposed in the articulator body and is electrically connected to the plural customized electrode sheets.

The electrical stimulation module is configured to send an electrical stimulation signal to the plural customized electrode sheets to train a muscular endurance of infrahyoid muscles of the user. Therefore, in addition to increasing the training effect by the above-mentioned precise training of the infrahyoid muscles, the in vitro training device can be in a compact, tidy form to permit easy use and carriage.

In an example, the plural customized electrode sheets includes a tongue top type and a tongue side type. Each customized electrode sheet of the tongue top type is in a form of a thin plate and engages with a lower surface of the oral portion. Each customized electrode sheet of the tongue side type has a block detachably engaged with a respective one of the plural engagement portions and protruding beyond the lower surface of the oral portion. A tooth abutting face is formed on an outer side of the block. An electrical conductive portion is formed on an inner side of the block.

Therefore, the top surface and the two sides of the tongue can be precisely and electrically stimulated by the simple structure, increasing the convenience of manufacture and replacement assembly.

In an example, the tooth abutting face has a contour formed according to the oral cavity model to match with an inner side of a bottom row of teeth of the user. Therefore, the abutment with the bottom row of teeth of the user can be improved, and precise positioning of the oral portion in the oral cavity of the user can be aided.

In an example, the electrical stimulation module is located in the exposed portion of the articulator body and includes at least one power source and a control unit. The at least one power source is in electrical connection with the plural customized electrode sheets and the control unit. The control unit is configured to control the electrical stimulation signal sent to the plural customized electrode sheets. Therefore, the structure and the weight of the in vitro training device can be simplified and reduced.

In an example, the control unit is coupled with an intelligent device and is configured to adjust a stimulation intensity and/or a frequency of the electrical stimulation signal through an application interface of the intelligent device. Therefore, the user may adjust the electrical stimulation effect according to the needs and comfort at any time, which improves the training effect and the experience of training comfort.

In an example, the electrical stimulation signal has a voltage adjustment range of 0-100 V, an electric current adjustment range of 0-30 mA, a pulse width adjustment range of 5-500 ms, and a frequency adjustment range of 1-80 Hz. Therefore, the user may start, adjust, pause, or stop the electrical stimulation according to needs, which improves the operational convenience and assures the use safety and the training effect.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

When the terms "front", "rear", "left", "right", "up", "down", "top", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

DETAILED DESCRIPTION OF THE INVENTION

Figure 1:
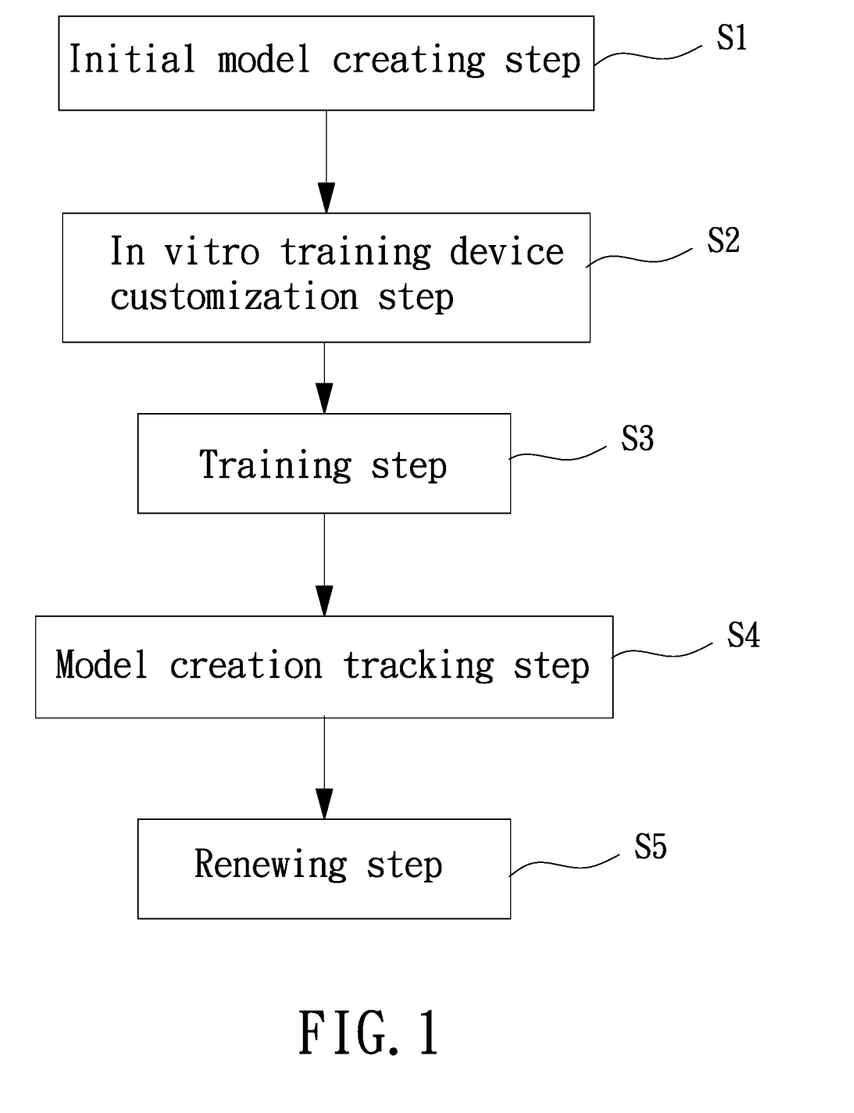
FIG. 1 is a flowchart illustrating an in vitro training method according to the present invention.
Figure 2:
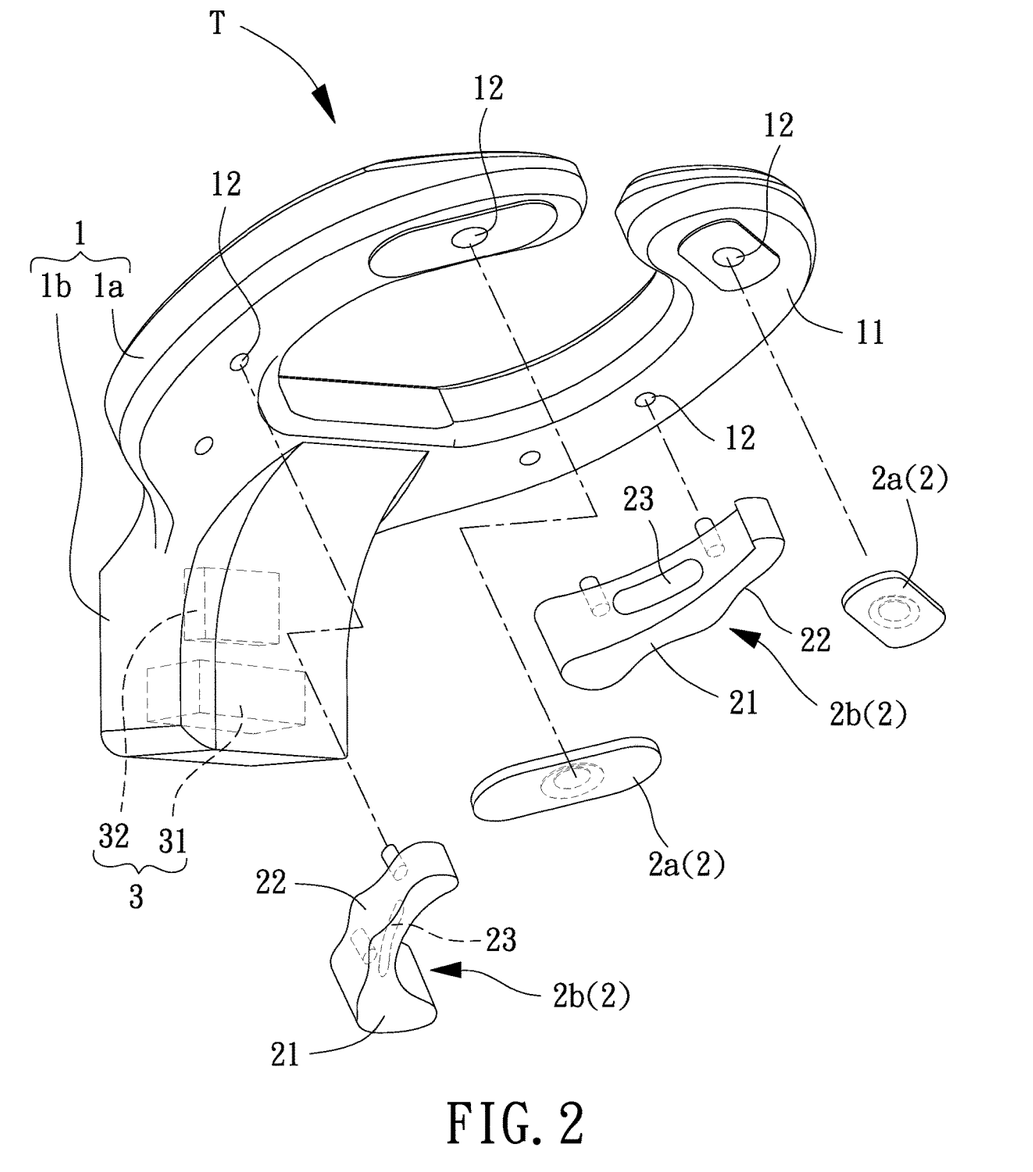
FIG. 2 is an exploded, perspective view of an in vitro training device of a preferred embodiment according to the present invention.

With reference to FIGS. 1 and 2, the present invention provides an in vitro training method for improving sleep apnea. The method includes an initial model creating step S1, an in vitro device customization step S2, a training step S3, a model creation tracking step S4, and a renewing step S5.

In the initial model creating step S1, the oral cavity of a user is scanned to create a first oral cavity model. The user may go to a sleep therapy center to proceed with a sleep study or an estimation by a clinical doctor. In a case that the sleep apnea belongs to the tongue root blockage type, an internal image of the oral cavity of the user may be obtained through computed tomography or an instrument, such as an intraoral scanner, and a three-dimensional oral cavity model (i.e., the first oral cavity model) can be created through a medical software.

Figure 3:
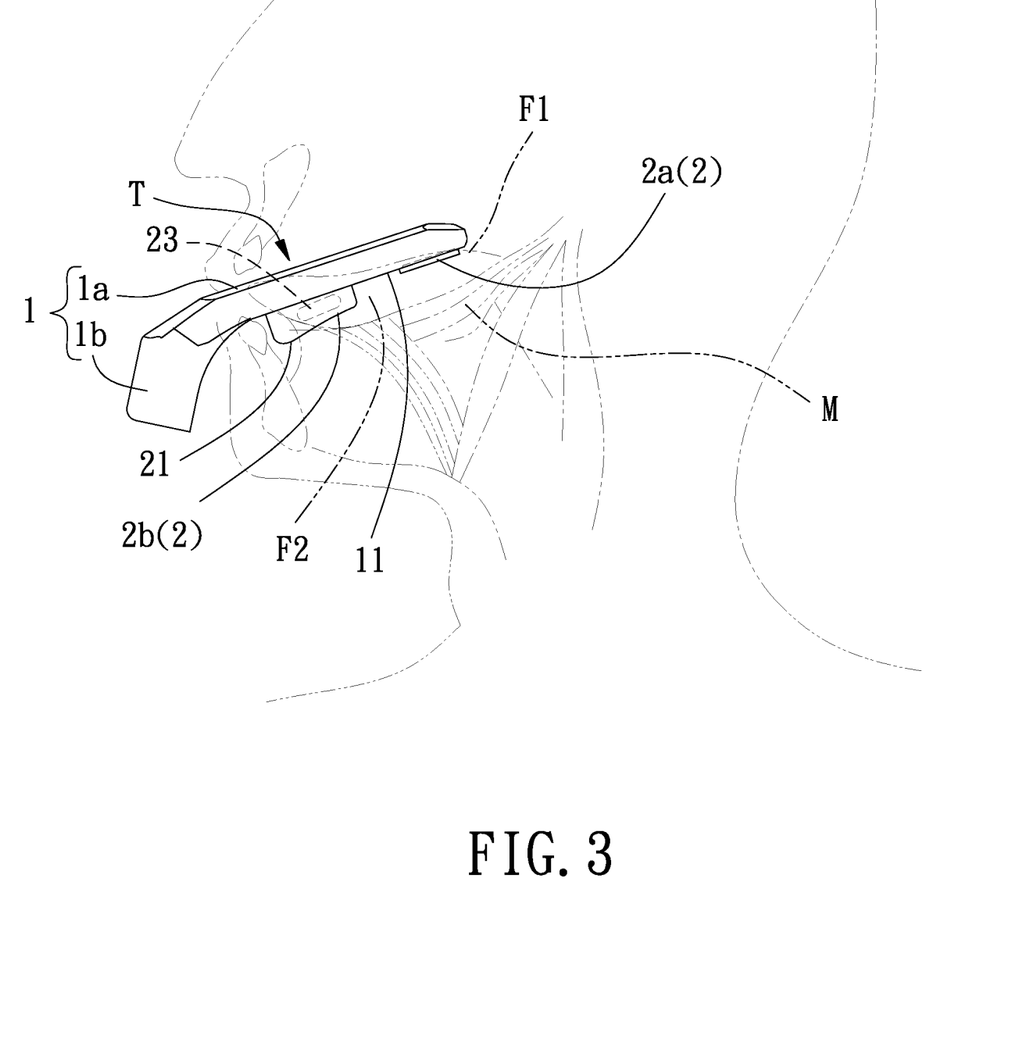
FIG. 3 is a schematic view illustrating use of the in vitro training device according to the present invention.

In the in vitro training device customization step S2, an articulator body 1 is selected according to the first oral cavity model, and plural first customized electrode sheets 2 are formed. Then, the plural first customized electrode sheets 2 are assembled onto the articulator body 1 to obtain an in vitro training device T. The articulator body 1 is substantially Y-shaped and includes a substantially V-shaped oral portion 1a and a substantially I-shaped exposed portion 1b. The oral portion 1a and the exposed portion 1b may be connected as an integral piece. In use, the oral portion 1a can be inserted into a mouth of the user, whereas the exposed portion 1b is outside the mouth, as shown in FIG. 3. The articulator body 1 may have a small, medium, or large size, which is based on the maximum width of the oral portion 1a. When used for the first time, an articulator body 1 including an oral portion 1a of an appropriate width is selected according to the first oral cavity model of the user.

The lower surface 11 of the oral portion 1 may include plural engagement portions 12 for detachable engagement with the plural first customized electrode sheets 2. In this embodiment, the plural first customized electrode sheets 2 may include a tongue top type 2a and a tongue side type 2b. Each first customized electrode sheet 2 of the tongue top type 2a may be in the form of a thin plate and may be formed according to a tongue top surface F1 of the first oral cavity model, thereby having a size and shape in response to various assembling positions. Each first customized electrode sheet 2 may have a three dimensional contour. For example, each first customized electrode sheet 2 may include a block 21 detachably engaged with a respective one of the plural engagement portions 12 and protruding beyond the lower surface 11 of the oral portion 1a. Furthermore, a tooth abutting face 22 may be formed on an outer side of the block 21 and may abut an inner side of a bottom row of teeth of the user. The tooth abutting face 22 may be formed according to the first oral cavity model to form an outline matching with the inner side of the bottom row of teeth of the user. Thus, the abutment with the bottom row of teeth of the user can be improved, and precise positioning of the oral portion 1a in the oral cavity of the user can be aided. Furthermore, each first customized electrode sheet 2 of the tongue side type 2b may have an electrical conductive portion 23 formed on an inner side of the block 21.

The customized plural first customized electrode sheets 2 may be aligned and assembled with the plural engagement portions 12 of the oral portion 1a, respectively. In this embodiment, two first customized electrode sheets 2 of the tongue top type 2a may be respectively engaged with two sides of an opening of the V-shaped structure of the oral portion 1a. Furthermore, a first customized electrode sheet 2 of the tongue side type 2b is assembled between an interconnection of the oral portion 1a and the exposed portion 1b and one of the two first customized electrode sheets 2 of the tongue top type 2a. In use, the tooth abutting face 22 of each of the two first customized electrode sheets 2 of the tongue side type 2b faces the inner side of the bottom row of teeth of the user, and the electrical conductive portions 23 of the two first customized electrode sheets 2 of the tongue side type 2b face inward to respectively face the left and right sides of the tongue of the user.

Figure 4:
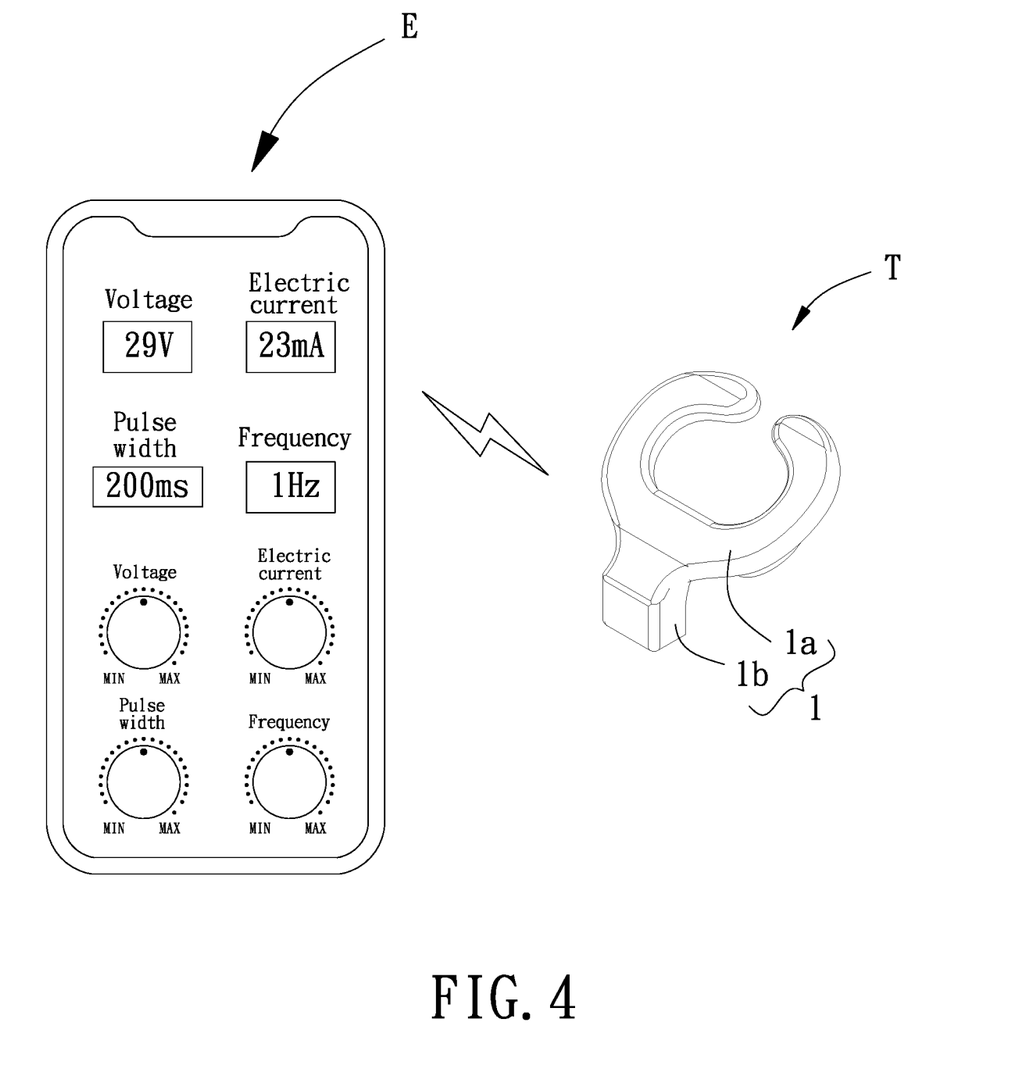
FIG. 4 is a schematic view illustrating coupling between the in vitro training device according to the present invention and an intelligent device.

Furthermore, the in vitro training device T includes an electrical stimulation module 3 disposed in the articulator body 1. The electrical stimulation module 3 is configured to send an electrical stimulation signal (with a predetermined voltage, a predetermined electric current, a predetermined frequency, and a predetermined pulse duration) to the first customized electrode sheets 2 engaged with the plural engagement portions 12. In this embodiment, the electrical stimulation module 3 is located in the exposed portion 1b of the articulator body 1 and includes at least one power source 31 and a control unit 32. The plural first customized electrode sheets 2 assembled on the articulator body 1 are in electrical connection with the at least one power source 31. The at least one power source 31 may also be in electrical connection with the control unit 32 to provide electricity to the control unit 32. The control unit 32 is configured to control the electrical stimulation signal sent to the first customized electrode sheets 2 engaged with the first plural engagement portions 12. With reference to FIG. 4, the control unit 32 may be coupled with an intelligent device E, such as a mobile phone, a tablet, or a smart watch, which permits the user to proceed with personalized setting through an application interface of the intelligent device E according to the needs and comfort, thereby adjusting the stimulation intensity and/or the frequency of the electrical stimulation signal to improve the training effect and the training experience. For example, the voltage adjustment range may be 0-100 V, the electric current adjustment range may be 0-30 mA, the pulse width adjustment range may be 5-500 ms, and the frequency adjustment range may be 1-80 Hz. Thus, the user may start, adjust, pause, or stop the electrical stimulation according to needs.

With reference to FIGS. 1 and 3, in the training step S3, the user bites the in vitro training device T during a non-sleep period. Furthermore, the plural first customized electrode sheets 2 are used to proceed with electrical stimulation on the top surface and two sides of the tongue, thereby training the muscular endurance of the infrahyoid muscles M of the user.

Specifically, during training, the user can place the oral portion 1a of the articulator body 1 into the mouth during the non-sleep period, and the abutting faces 22 of the first customized electrode sheets 2 of the tongue side type 2b abut the inner side of the bottom row of teeth of the user, such that the electrical conductive portions 23 are approximately aligned with the left and right sides F2 of the tongue of the user. At this time, the first customized electrode sheets 2 of the tongue top type 2a are approximately aligned with the tongue top surface F1 of the user. Thus, the electrical stimulation module 3 can provide the electrical stimulation signal to the plural first customized electrode sheets 2. The first customized electrode sheets 2 of the tongue top type 2a proceed with electrical stimulation on the tongue top surface F1, and the first customized electrode sheets 2 of the tongue side type 2b proceed with electrical stimulation on the left and right sides F2 of the tongue, thereby training the infrahyoid muscles M of the user to restore their muscular endurance.

In the model creation tracking step S4, after a training period, the oral cavity of the user is scanned again to create a second oral cavity model. Since the infrahyoid muscles M of the user become stronger after a period of electrical stimulation training. The infrahyoid muscles M may become larger or smaller or shifted, such that the plural first customized electrode sheets 2 may not be able to proceed with electrical stimulation on the expected locations of the infrahyoid muscles M while executing the above training step S3, thereby adversely affecting the training effect. Therefore, the training period may be set, such as one month. Namely, when the training period during which daily execution of the training step S3 is executed by the user ends, the user should book a return appointment time for rescanning the oral cavity of the user to create the second oral cavity model.

In the renewing step S5, the first oral cavity model is compared with the second oral cavity model. When the image overlap rate of the first oral cavity model and the second oral cavity model is lower than 80%, plural second customized electrode sheets are formed according to the second oral cavity model to replace the plural first customized electrode sheets 2 assembled on the articulator body 1.

Specifically, by the image overlap rate of the first oral cavity model and the second oral cavity mode, a change in the type of the infrahyoid muscles M of the user after the training period can be known. When the image overlap rate of the first oral cavity model and the second oral cavity model is lower than 80%, which means the muscle type has an obvious change, the originally customized plural first customized electrode sheets 2 may be about to become unable to proceed with electrical stimulation on expected locations of the infrahyoid muscles M, such that plural second customized electrode sheets should be made according to the second oral cavity model. After formation of the plural second customized electrode sheets, the plural first customized electrode sheets 2 initially assembled on the articulator body 1 are detached, and the plural second customized electrode sheets are installed, such that the renewed device can match the current muscle type of the infrahyoid muscles M of the user. Therefore, electric stimulation can be continuously and precisely conducted on the expected locations of the infrahyoid muscles M of the user, thereby assuring the training effect.

In a case that the image overlap rate of the first oral cavity model and the second oral cavity model is lower than 80% but not lower than 70%, which means the waiting time between the return appointment and the previous appointment is appropriate, and the next appointment time may be set according to the same time period. Namely, a suggested return appointment waiting time approximately equal to the training period may be set. In another case that the image overlap rate of the first oral cavity model and the second oral cavity model is lower than 70%, which means the waiting time between the return appointment and the previous appointment is too long, and the currently used plural first customized electrode sheets 2 have been failed to precisely proceed with electrical stimulation on the infrahyoid muscles M of the user for a period of time. Thus, after renewing and replacing the plural first customized electrode sheets 1 with the plural second customized electrode sheets formed according to the second oral cavity model, the suggested return appointment waiting time should be shorter than the training period, preferably shorter than two thirds of the training period and longer than a half of the training period. For example, assuming the previous training period of training the infrahyoid muscles M by the plural first customized electrode sheets 2 is one month, the training period after replacing the plural first customized electrode sheets 2 with the plural second customized electrode sheets should be shorter than one month. Thus, the next suggested return appointment waiting time will be shorter than one month, preferably 10-20 days. Furthermore, it can be expected that the image overlap rate of the oral cavity model created by the next scanning and the second oral cavity model would be lower than 80% but not lower than 70%.

Furthermore, in a case that the image overlap rate of the first oral cavity model and the second oral cavity model is not lower than 80%, which means the plural customized electrode sheets currently engaged with the articulator body 1 can still precisely proceed with electrical stimulation on the infrahyoid muscles M of the user. Thus, the return appointment is still too early, and the plural customized electrode sheets are still useable and, thus, without the need of replacement. Therefore, it is not necessary to interrupt the training of the infrahyoid muscles M of the user (it will take several days to make the customized electrode sheets according to a new oral cavity model), and the user may return to the hospital several days later. Namely, the suggested return appointment waiting time may be shorter than the training period and preferably shorter than a half of the training period and longer than one third of the training period, which can be judged according to the image overlap rate. The higher the image overlap rate, the longer the suggested return appointment waiting time. For example, the training period of training the infrahyoid muscles M using the plural first customized electrode sheets 2 is one month, the user returns to the hospital after the one-month training period and finds that the image overlap rate of the first oral cavity model and the second oral cavity model is not lower than 80%, the plural first customized electrode sheets 2 can be still used to proceed with training of the infrahyoid muscles M, and the user may return to the hospital in a month, preferably 10-15 days. The image overlap rate of the oral cavity model created by the next scanning and the first oral cavity model is examined again to check whether it is lower than 80% which demands production of new customized electrode sheets for replacement.

Therefore, the in vitro training method for improving sleep apnea uses the customized electrode sheets to more precisely proceed with electrical stimulation on the infrahyoid muscles of the user to thereby train the muscular endurance of the infrahyoid muscles, which assists the user in restoring the original tension of the infrahyoid muscles and, thus, improves the airway blockage problem resulting from sinking of the tongue during the sleep period, thereby improving the symptoms of sleep apnea. Furthermore, the user may return to the hospital every once in a while to check the change in the type of the infrahyoid muscles, and new customized electrode sheets may be made timely according to the current type of the muscles. This ensures the user to proceed with effective electric stimulation training on the infrahyoid muscles for a long period of time to assure the training effect and may even improve the symptoms of sleep apnea more efficiently than the conventional methods.

In summary, the in vitro training method and the in vitro training device for improving sleep apnea according to the present invention include the following advantages:

(1) Excellent training effect: The present invention customizes the electrode sheets particularly for the personal articulator according to the oral cavity model of each user and cooperates with timely replacement of the customized electrode sheets made according to the current muscle type. In comparison with the conventional articulators of a public design, the present invention allows each user to precisely train the infrahyoid muscles to restore the muscular tension, thereby assuring excellent training effect.

(2) Accurate suggestion of the return appointment time: Through comparison of the image overlap rate, the present invention can accurately suggest the next return appointment time according to the muscle training condition of each user, avoiding waste of time while assisting in establishment of a good doctor-patient relationship.

(3) No adverse effect on the sleep quality: The electrical stimulation of the present invention is not carried out during the sleep period and, therefore, will not cause discomfort during the sleep period and, thus, will not adversely affect the sleep quality of the user.

(4) Increasing the intention of continuous use: The user may proceed with the electrical stimulation at any convenient time and place in the daytime, which can effectively increase the training convenience and comfort for the user, thereby increasing the user's intention of continuous use.

(5) No operational risks: The in vitro training method of the present invention is not invasive and requires no devices to be implanted in the operation. This avoids the risks and inconvenience caused by the operational procedure and significantly reduces the burden to the user caused by the training.

(6) Easy to use and carry: The in vitro training device of the present invention is compact and very easy to carry. By contrast, CPAP can only be used near the equipment, and many cable ties and pipelines are disposed around the head of the user. The pipelines may even cause indentations on the face of the user. The user may walk at will when using the in vitro training device. The problems of many cable ties and pipelines required in the conventional CPAP are avoided. Therefore, the present invention is easy to use and significantly increases the comfort during use.

(7) Reduction in the equipment investment costs: In comparison with the conventional methods including an operation or use of an expensive CPAP, the in vitro training device of the present invention has a lower equipment investment cost, such that more medical institutes and clinics can provide corresponding training services. Furthermore, the user can purchase his or her personal in vitro training device under a light burden and can proceed with the electrical stimulation at any time. Furthermore, the in vitro training device of the present invention has a simple structure and provides effects of increased maintenance efficiency and reduced maintenance costs.

(8) Saving time or labor cost: Use of the in vitro training method and the in vitro training device of the present invention does not require the time for operation and recovery while reducing the demand in the medical staff for the operation or training, thereby saving the time and labor costs.

Although the present invention has been described with respect to the above preferred embodiments, these embodiments are not intended to restrict the present invention. Various changes and modifications on the above embodiments made by any person skilled in the art without departing from the spirit and scope of the present invention are still within the technical category protected by the present invention. Accordingly, the scope of the present invention shall include the literal meaning set forth in the appended claims and all changes which come within the range of equivalency of the claims. Furthermore, in a case that several of the above embodiments can be combined, the present invention includes the implementation of any combination.

What is claimed is:

1. An in vitro training method for improving sleep apnea, comprising:
   scanning a user's oral cavity to create a first oral cavity model;
   selecting an articulator body according to the first oral cavity model, forming plural first customized electrode sheets, and assembling the plural first customized electrode sheets onto the articulator body to obtain an in vitro training device;
   the user biting the in vitro training device during a non-sleep period and using the plural first customized electrode sheets to proceed with electrical stimulation on a top surface and two sides of a tongue of the user, thereby training a muscular endurance of infrahyoid muscles of the user for a training period;
   scanning the user's oral cavity again to create a second oral cavity model; and
   comparing the first oral cavity model with the second oral cavity model, wherein when an image overlap rate of the first oral cavity model and the second oral cavity model is lower than 80%, plural second customized electrode sheets are formed according to the second oral cavity model to replace the plural first customized electrode sheets assembled on the articulator body.

2. The in vitro training method for improving sleep apnea as claimed in claim 1, wherein when the image overlap rate of the first oral cavity model and the second oral cavity model is lower than 80% but not lower than 70%, a suggested return appointment waiting time equal to the training period is set.

3. The in vitro training method for improving sleep apnea as claimed in claim 1, wherein when the image overlap rate of the first oral cavity model and the second oral cavity model is lower than 70%, a suggested return appointment waiting time shorter than the training period is set.

4. The in vitro training method for improving sleep apnea as claimed in claim 3, wherein the suggested return appointment waiting time is shorter than two thirds of the training period and longer than a half of the training period.

5. The in vitro training method for improving sleep apnea as claimed in claim 1, wherein when the image overlap rate of the first oral cavity model and the second oral cavity model is not lower than 80%, the plural first customized electrode sheets are not replaced, and a suggested return appointment waiting time shorter than the training period is set.

6. The in vitro training method for improving sleep apnea as claimed in claim 5, wherein the suggested return appointment waiting time is shorter than a half of the training period and longer than one third of the training period.

\* \* \* \* \*